United States Patent
Bachmann et al.

(10) Patent No.: US 7,681,703 B2
(45) Date of Patent: Mar. 23, 2010

(54) PROCEDURE AND A CONTROL APPARATUS FOR THE SAFE DIVISION OF A DRIVETRAIN

(75) Inventors: Volker Bachmann, Eriskirch (DE); Mario Steinborn, Friedrichshafen (DE); Rudolf Kalthoff, Weingarten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/954,510

(22) Filed: Dec. 12, 2007

(65) Prior Publication Data

US 2008/0090698 A1 Apr. 17, 2008

Related U.S. Application Data

(62) Division of application No. 11/284,794, filed on Nov. 22, 2005, now abandoned.

(30) Foreign Application Priority Data

Nov. 26, 2004 (DE) .................. 10 2004 057 127

(51) Int. Cl.
*F16H 61/18* (2006.01)
*B60W 10/02* (2006.01)
*B60W 10/10* (2006.01)

(52) U.S. Cl. .................. 192/3.63; 192/3.54

(58) Field of Classification Search .............. None
See application file for complete search history.

(56) References Cited

U.S. PATENT DOCUMENTS

| 2,374,869 A | * | 5/1945 | Leukhardt ................ 192/91 R |
| 5,020,385 A | | 6/1991 | Bader |
| 5,921,137 A | | 7/1999 | Buri et al. |
| 6,012,345 A | * | 1/2000 | Wafzig et al. ................ 74/335 |
| 6,044,721 A | | 4/2000 | Genise |
| 6,250,172 B1 | | 6/2001 | Pigozzi et al. |
| 6,463,823 B2 | | 10/2002 | Walker |
| 6,626,796 B2 | | 9/2003 | Schwab et al. |
| 6,939,268 B2 | * | 9/2005 | DeVore et al. ............. 477/175 |
| 2004/0261556 A1 | | 12/2004 | Döbele |

FOREIGN PATENT DOCUMENTS

| DE | 40 06 653 A1 | | 9/1990 |
| DE | 196 33 279 A1 | | 2/1998 |
| DE | 199 26 697 A1 | | 12/2000 |
| DE | 100 16 582 A1 | | 10/2001 |
| DE | 101 05 749 A1 | * | 8/2002 |
| DE | 101 52 857 A1 | | 5/2003 |
| EP | 0 541 023 A1 | | 10/1992 |
| EP | 0 985 860 A1 | | 8/1999 |
| EP | 1 035 357 A1 | | 9/2000 |
| EP | 1 092 894 A2 | | 4/2001 |
| WO | WO-02/092378 A1 | | 11/2002 |

* cited by examiner

*Primary Examiner*—Rodney H Bonck
(74) *Attorney, Agent, or Firm*—Davis & Bujold, P.L.L.C.

(57) ABSTRACT

The invention concerns a procedure and a control apparatus for the control of a drivetrain, which comprises at least one automatic clutch, at least one automatic shifting transmission, one control apparatus for the control of the at least one automatic clutch and of at least one automatic shifting transmission as well as at least two transmission idling positions in the drivetrain. In order to avoid dangerous situations, which could arise from an improper automatic input of a neutral position of a transmission and a thereto connected automatic closure of the clutch. The proposal is, that the control apparatus, by way of the shifting of an automatized shifting transmission into a neutral position, to at least two transmission idling positions, the neutral position is put into action.

6 Claims, 1 Drawing Sheet

PROCEDURE AND A CONTROL APPARATUS FOR THE SAFE DIVISION OF A DRIVETRAIN

This application is a divisional application of U.S. patent application Ser. No. 11/284,794 filed Nov. 22, 2005, which claims priority from German Patent Application Serial No. 10 2004 057 127.9 filed Nov. 26, 2004.

FIELD OF THE INVENTION

The invention concerns a procedure and a control apparatus for the regulation of at least an automatic transmission in a drivetrain.

BACKGROUND OF THE INVENTION

Automatically shiftable transmissions have been used for a considerable time in various motor vehicles. Especially in the case of commercial vehicles more of these transmissions are arranged in a drivetrain with a first transmission having a plurality of ratio settings and one or more neutral positions available, and a second transmission enabling exactly two different ratio stages and one neutral position. By way of a combination of both transmissions, the number of possible gear positions is doubled.

Along with the above, many types of transmission assemblies are known in which two or more automatic transmissions are combined into one constructed unit. Such a group transmission can be created from a principal transmission, a so-called "splitter" and a range group. Besides, it is possible that in the drivetrain further shiftable transmissions exist, such as integrated, shiftable distribution transmissions, which likewise enable a neutral position.

Hereinafter, concerning a shiftable gear train, i.e., a shiftable transmission, what is to be understood is an apparatus for the transmission of torques and speeds of rotation, where the selection includes at least two different gear ratios and a neutral position without essential torque transfer, between an input shaft and an output shaft of a transmission. An automatic transmission characterized by a transmissions, by which different speed-ratios may be set up by evaluation of present parameters including gear trains, in the case of which at least a change of the speed-ratios and/or a shift of the transmission into a neutral position without manual intervention of an operator becomes possible. In these arrangements, the control operation can be powered by hydraulic, pneumatic or electric media.

The drivetrain establishes the connection between a source of torque which, in the case of a motor vehicle, is usually a piston driven, internal combustion motor and a drivable torque sink, such as is usual in the practice of motor vehicles, the driven wheels of the vehicle. Where the inventive procedure is concerned, the source of torque can be an electric motor or a combination of various motors. The torque sink can be an additional drive system of the vehicle or may consist of a stationary operating machine.

Especially in the case of vehicles with automatic transmissions, it can be necessary to disconnect the drivetrain, without an explicit command from the driver in the form of a manual shift. In a case when the vehicle is stationary, and/or by using a braking device, a transmission can be switched into the neutral position to be able to again disengage an engaged clutch which is in an unsynchronized condition. As this is being carried out, a release of the brakes for torque transmission from the motor to the driven wheels, accompanied by an undesirable loose rolling of the vehicle, must be avoided.

Accordingly, automatic shifting of a transmission into the neutral position can also be considered in other cases and is of value, for instance when exceeding a predetermined time interval after stopping of the vehicle, caused by the failure of the motor or possibly certain operational mishaps of added equipment. It is certainly desirable to shift into neutral position when the motor hood is opened, a door is opened or a driver's seat is empty, such that an uncontrolled rolling of the vehicle can be prevented.

In accordance with the present state of the technology, however, it is possible that, at the point of time for engaging the previously disengaged clutch, there is a gear ratio still engaged, because the setting of the neutral position could incorrectly be in error, due to failure of a sensor. This can lead to undesirable, as well as dangerous operational conditions, if the vehicle begins moving unexpectedly and undesirably or an additional element starts by itself. Further, engaging the flow of force with only partially engaged gear or generally by a non-defined operational condition, leads to considerable wear or even to immediate failure of the drivetrain.

With this background taken into consideration, from DE 101 52 857 A1, a procedure for shifting a multi-group transmission has been made known. This consists of a pre-shift group, a principal shift group and a range group, where the range group transmission includes a first shift for a slow total transmission ratio, a second shift for a fast total transmission ratio and a third shift to achieve a neutral position. Upon gear changes, which a shifting of the range group transmission entails, the range group transmission and the pre-shift group are brought into the neutral position in order to shorten the shifting times and to decelerate the main transmission as well as to accomplish a noise-free shift of the same.

Shifting actions in which the range group transmission does not take part, that is, in the case of shifting when the shift-position of the range group transmission is the same both before and after the shift when shifting in the conventional manner. DE 101 52 857 A1 concerns itself neither with the problem of an unintended rolling of the vehicle, because the transmission is erroneously shifted into the neutral position, nor can a strategy for the solution to this matter be inferred from the proposal. The focus is that by way of entirely exact shifting procedures, two transmissions are brought into the neutral configuration simultaneously for the reason that these exact shifting procedures could be carried out more rapidly or with less noise.

Correspondingly, DE 199 26 697 A1 discloses a control apparatus for an automatic, multi-gear transmission for a motor vehicle where, if the motor vehicle is not yet in a condition ready to run, essentially the trouble could lie in the fact that a friction clutch is disengaged, a gear engaged and the motor of the vehicle operates, but driving the vehicle with the motor is completely prevented because, by way of the control apparatus, the transmission is shifted into the neutral state The targeted purpose is concerned with the prevention of dangerous situations which, for example, could be created by erroneous or unintended engagement of the clutch by engaged gearing or by the activation of the gas pedal rod by a mechanic in the motor space. The probabilities of error of one of the signals indicating neutral positions of the transmission, that is to say, an unknown questionable construction of an installed shifting signal for the input of a neutral position of a transmission, is not discovered as a source of error and a solution to this problem is not provided in this document. If incorrect data exists in the control apparatus, indicating that the transmission is in a neutral position, the clutch the engages, whereby the vehicle could inadvertently start moving.

Information stating that a transmission is in a neutral position can be explicitly presented in the form of a sensor signal. Such information is implicitly present if, for example, no corresponding sensor is provided and in accordance with the issuance of a command for shifting into "neutral position", a time delay occurs which, in normal operation, would be sufficient for the issuance of a different command.

With consideration given to the above background, the purpose of the invention is to present a control procedure and a corresponding apparatus for the execution thereof by an automatic transmission with which an unwanted rolling start of the vehicle, i.e., inadvertent rolling of an attachment to the vehicle can be prevented, even under circumstances where data declares false information, such as the false reporting that a transmission is shifted into a neutral position.

BRIEF DESCRIPTION OF THE DRAWINGS

Below, the present invention is described in more detail with reference to the drawings which show in.

DETAILED DESCRIPTION OF THE INVENTION

Figure 1:
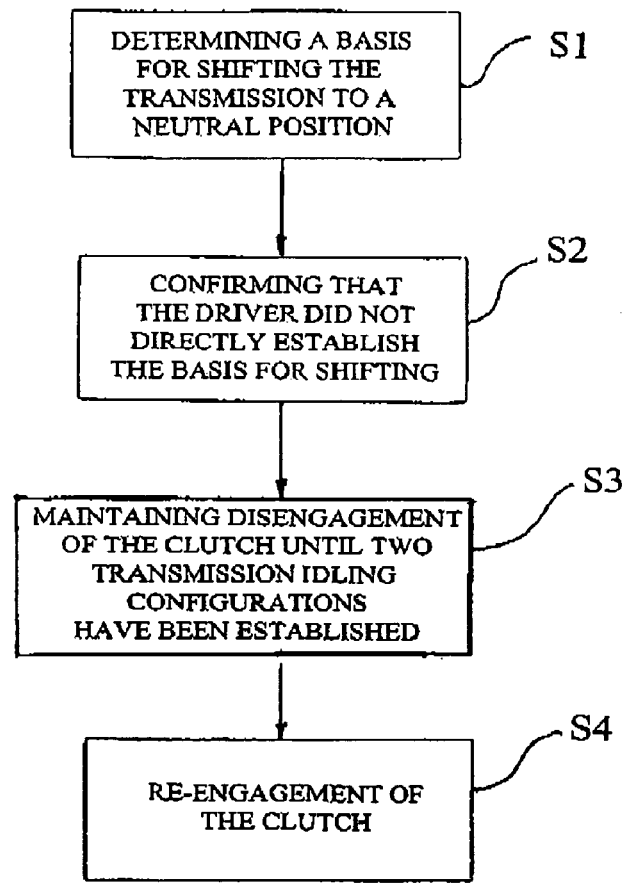
FIG. 1 a schematic illustration, in flow chart form, of the method for preventing rolling of a vehicle from a stationary position.

The invention is based on the knowledge that generally, more transmissions or transmission sections are available in a drivetrain, which respectively form an automatic shifting transmission so as to have at least two working ratios and one neutral position in which no torque is transferred or at most a negligible amount is transferred. If in the control apparatus, erroneous data is present and indicates that an automatic transmission is in a neutral position and due to this information a previously open clutch of the drivetrain closes, this can lead to a dangerous situation and/or to damage of components of the drivetrain. This is prevented by the current invention, in which at least two automatic shifting transmissions are shifted into a neutral position before the prior disengaged clutch of the drivetrain is engaged. It may be obvious that in this case, only such neutral positions are intended, which are active relative to the drivetrain and which are also capable of interrupting the flow at torque from the torque source to the torque sink.

Accordingly, the invention is based on a procedure for controlling a drivetrain, which possesses at the least an automatic clutch, at least an automatic shifting transmission, a control apparatus for regulating the at least one automatic clutch and consists of at least one automatized shifting transmission, as well as two transmission idling configurations in the drivetrain onto which a mechanically neutral position of a transmission can be added.

For a literal simplification, the concept of a "transmission idling configuration" means here, a configuration or even a portion in the drivetrain, regarding which it is possible to interrupt the flow torque by way of the engagement of a neutral position. In regard to this, even several transmission idling configurations in one transmission can exist, insofar as at several positions, respectively, a neutral position of the transmission can be brought about. This results in that transmission idling configurations in the drivetrain can be made part of a main transmission, a splitter, a range group and/or be placed in a shiftable distributive transmission.

To achieve the above stated purpose, provision is made that the control apparatus when shifting adjusts at least one automatic shifting transmission into a neutral position and engages the neutral position at at least two transmission idling configurations.

As this is done, it is inconsequential whether the transmission idling configuration is effectuated within a transmission as can be done in the case of a vehicle with a group transmission or whether the case is one or more transmission idling configuration units of the same drivetrain which are constructionally separate from the first transmission. Even in this case, it is not essential whether the placement of the neutral position at the transmission idling configuration respectively leads to the expected result. Precisely, if a placing the neutral position at a transmission idling configuration fails, the technologically protective action of the procedure encompasses this in accordance with the invention. The concept "placing in the neutral position" in this connection, accordingly, is to be understood exclusively in the realm of the purpose of a corresponding issued notice from the control apparatus.

In one advantageous embodiment of the procedure according to the invention, the control apparatus adjusts during an adjustment of at least one automatic shifting transmission into a neutral position, at least two transmission idling configurations, where shifting into the neutral position is not attributed to a direct desire of the driver and the torque sink is at least approaching a stationary state. With a "stationary state of the torque sink", what is meant is that the vehicle wheels are not turning.

When the driver expresses a direct intention for skipping the neutral position, for example by shifting the vehicle's automatic transmission gearshift into a gear, it can be advantageous to directly shift an automatic shifting transmission into a neutral position to shorten the time for renewed engagement of a driving gear. In carrying this out, should something like a faulty sensor transmit a faulty function and erroneously, not engage the neutral position, the driver would detect this immediately and repress negative results, for instance, by activating the braking pedal or by turning the motor off.

However, if the flow torque, by shifting the automatic shifting transmission into the neutral position is interrupted without directly notifying the driver, this being done, for example, in such that the clutch can be released after a certain time interval, it is possible that a corresponding reaction from the driver may not safely be anticipated.

It is possible for the driver to lightly actuate the handbrake, which then automatically disengages a clutch to release the drivetrain. After the driver has physically exited the vehicle, after a certain time, the control emits a command for shifting the principal transmission into the neutral position and releases the clutch after receiving a fulfillment-confirmation in the form of a sensor value or after a predetermined time interval, which leads to an engagement closing thereof.

The neutral position is erroneously engaged due to the faulty data sent to the control apparatus by the defective sensor and the command is appropriately reversed, the engagement of the clutch would start the driverless vehicle moving, if it were not prevented by the inventive procedure.

In order to prevent inadvertent drive of a vehicle or the unintended rolling of the same, it is possible in accordance with another embodiment of the inventive procedure for the control apparatus to retain at least one clutch in the disengaged neutral position at least until that point in time of shifting of the at least one automatic shifting transmission when, in the control apparatus, information is input; that there are at least two transmission idling configurations in the drivetrain, before the mechanically neutral position is engaged.

During the procedure presented up to this point, with regard to the redundant engagement of the neutral position, by way of this formulation of the procedure, assurance has been given that at least one clutch is disengaged and is disengaged at that point in time shifting the automatic shifting transmission into the neutral position, and the clutch remains disengaged just until the control apparatus receives positive information that two transmission idling configurations have secured by being engaged in the neutral positions. It is decisive, in this matter, for information to be present in the control apparatus, the information coming from certain sensor signals or other indications confirming that both transmission idling configurations have been shifted into the neutral position. In the most simple case, it is possible that the control apparatus can prevent the engagement of the clutch until a predetermined interval of time has passed which, in the normal course of operation, would be sufficient for engaging the two transmission idling configurations in a neutral position.

A further advance in safety can be seen in the situation, when there is information in the control apparatus indicating that at least two transmission idling configurations in the drivetrain are in the mechanically neutral position, but this is only confirmed when a corresponding sensor signal from at least one of the transmission idling configurations is input into the control apparatus. Engagement of the formerly disengaged clutch is prevented until this information is confirmed by the sensor signal and has been input into the control apparatus. This increases the safety of method in comparison to the procedure as disclosed to this point because it is required to have a sensor signal indicating that the transmission idling configuration are in a neutral position before the control apparatus produces the command for engaging of the disengaged clutch.

Accordingly, full advantage has been taken that often the shifting position of certain transmission elements is monitored by sensors, while other transmission elements are not monitored by their own sensors. An optimal ratio of security to expense is achieved if the control apparatus evaluates the readily available sensor signals from transmission idling configurations, but dispenses with any additional sensors. In this regard, a sensor signal differing from an explicit sensor signal which indicates the position of a transmission idling configuration, can obviously also be a signal or a combination of several signals related to one or more values as long as the position of the transmission idling configuration can be inferred.

In a most favorable embodiment of the procedure, the required information that at least two transmission idling configurations in the drivetrain in the mechanically neutral position may be established in the control apparatus when corresponding sensor signals for at least two of these transmission idling configurations pass to the control apparatus and the control apparatus, up to the point of the presence of the required information, prevents engagement of the clutch.

The sensors for necessary determining the configuration of the transmission are, in the case of modern transmissions, often available with little trouble or a correct adjustment to the neutral position is easily by other sensor values. Checking that the command for shifting two transmission idling configurations into the neutral position was correctly executed provides a doubled redundancy. In this case, a function of the system will only be faulty, if both or all transmission idling configurations to which a command for a shift into the neutral position was sent, do not execute this command and, simultaneously, a signal indicating the command was correctly executed is sent from two of the corresponding sensor inputs to the control apparatus.

Should a command for shifting three or more transmission idling configurations into the neutral position be sent, this would result in a more secure operation only if at two of the corresponding receiving elements of sensors, a signal for a proper response to the command exists. In this way, an incorrect sensor signal does not lead to a permanent stop of the cancellation of the clutch signal.

Figure 2:
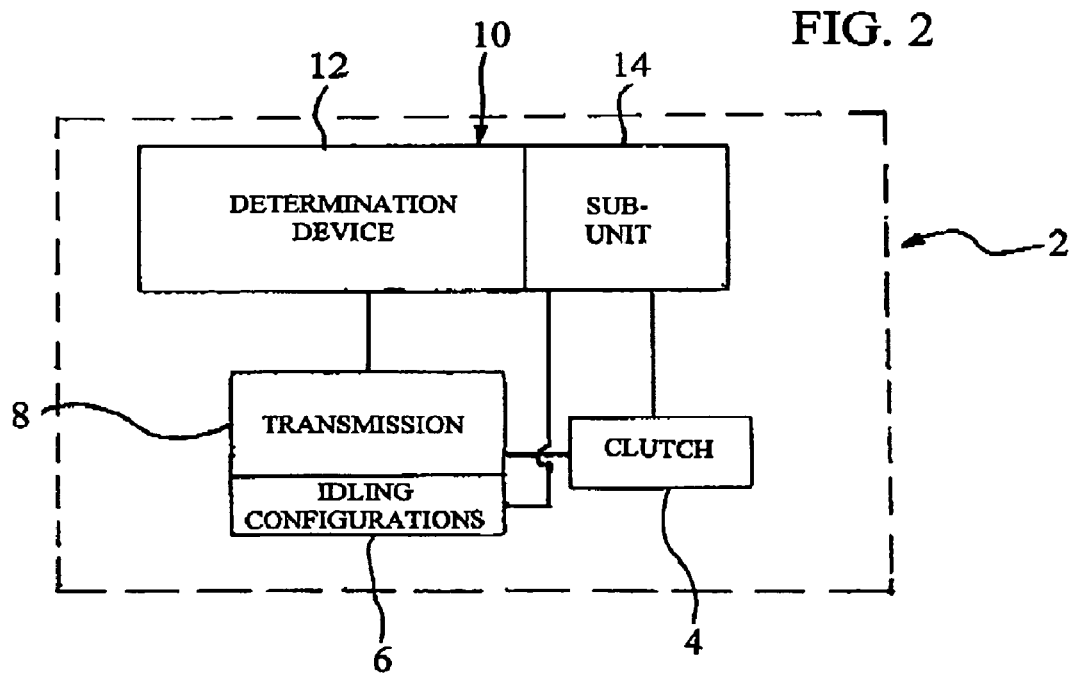
FIG. 2 a schematic illustration of a control device for preventing rolling of a vehicle from a stationary position.

With reference to FIGS. 1 and 2, for the carrying out of the procedure, it is possible that a control apparatus 10 for controlling the drivetrain of a vehicle 2 can be employed, where the drivetrain possesses at least one automatic clutch 4, at least one automatic shifting transmission 6 and at least two transmission idling configurations 8 in the drivetrain, at which the transmission is in a mechanically neutral position. Within this control apparatus, according to the invention, a subordinate device 14 is provided which, in the case of shifting at least one automatic shifting transmission into a neutral position, a signal for shifting at least two transmission idling configurations into the neutral position is created.

By way of such a control apparatus, it is possible that the inventive procedure can be carried out with very little expenditure of time or money since, as a rule, in any case, a control apparatus for the regulation and/or operation of the clutches and transmission of the drivetrain already exists. The subordinate device is implemented, in many cases, in the design of the control apparatus without any or at least with very little cost. The subordinate device can be adapted from an electronic circuit, used for an area intended for other purposes which, if needed, can be made available by inputting a corresponding program for this purpose.

When the control apparatus initiates a shifting procedure, if at least one automatic shifting transmission can only be shifted into a neutral position with at least two transmission idling configurations, then the neutral position can only be established by way of the control apparatus, provided that a determination device 12 determines that the shifting procedure is not the result of a driver's direct desire, step S1 and step S2, which makes possible to detect whether procedures for shifting the transmission into the neutral position are directly initiated by the driver. As already described, these shifting procedures can advantageously shorted the time for re-engaging step S4, eliminating the execution of the procedure.

Further, it is advantageous as in step S3 if a subordinate unit is provided within the control apparatus for issuing a signal to disengage at least one clutch until the control apparatus receives at least one sensor signal confirming that the transmission idling configurations have been shifted into the mechanically neutral position, the clutch being disengaged at the point in time when the procedure for shifting the at least one automatic shifting transmission into the neutral position is initiated. Preferably, this signal is issued for such a time, that at least two sensor signals are received by at least two transmission idling configurations, the two sensor signals relating to shifting those configurations into a mechanically neutral positions.

By way of this embodiment, it is assured that not only the command is given to shift at least two transmission idling configurations into the neutral position, but also at least for one transmission idling configuration, a sensor signals whether this command is carried out correctly, prior to disengaging the clutch which, up to that, time has been engaged.

Obviously, safety can be further increased, if two or more transmission idling configurations are monitored, checking the appropriateness of their neutral positioning and the clutch is then only engaged if, at least a positive signal is sent concerning two of the transmission idling configurations, confirming that the command for shifting into the neutral position has been carried out in the proper order.

The described apparatus can be used for a multitude of applications. It is entirely well suited for controlling and regulating the drivetrain of a motor vehicle, especially a commercial vehicle. The necessary elements and sensors are already widely available such that any additionally required expenditure of time and money can be held to a minimum. Furthermore, the apparatus is of especially great value when used in commercial vehicles because, without the inventive apparatus, there is a great risk that a motor vehicle can, in a worst case scenario, initiate drive by itself. Drivetrains of commercial vehicles, such as powered motor trucks, often possess several transmission idling configurations and are, on this account, easily adaptable for implementation of the invention.

If the at least one automatic shifting transmission possesses a gear train, which includes a main gear drive, a splitter and a range-group, there is, within this transmission, several transmission idling configurations and additionally also a wide range of ways to control the various subordinate gear groups of the transmission, such that the expenditure for implementing the inventive apparatus is held at a particularly low level.

The invention is further explained on the basis of one embodiment. This embodiment concerns a truck with a transmission having a main gear train, a splitter and a range group, which respectively have a self-contained means for interrupting the drivetrain by establishing a neutral position. All subordinate gear drives are regulated by one common control apparatus and signals from the main gear drive and the range group, have one sensor which monitors the respective transmission for the existence of a neutral position.

In a concrete exampe of an operational situation, the driver brakes his vehicle until it stops and then pulls the hand brake into engagement, which is a light restraint. He has thus placed himself in a mode of automatic selection of gears and in this kind of shifting by activation of the handbrake, when the vehicle is stationary, the brake-clutch automatically disengages so that the vehicle will not roll counter to the effect of the handbrake.

Since the brake-clutch assembly is engaged when it is in its inactivated condition, a control program ensures that after a certain time period, with a continuously disengaged brake-clutch on the main transmission, the neutral position is shifted into and subsequently the clutch is relieved by engagement. It is further assumed that, for several possible reasons, the shifting command to the principal transmission does not lead to shifting into the neutral position. Without an inventive apparatus, that is to say, an inventive procedure, the brake-clutch is relieved and thereby engaged. Since the principal transmission is not, at this point, in the neutral position, the vehicle rolls in spite of the light braking of the hand brake. In case the driver has exited the truck cab, say for example to clean the windshield, a dangerous situation can arise.

By way of the apparatus according to the invention, it is assured that the transmission control will detect an erroneous command for shifting into a neutral position which was not directly manually initiated by the driver. When this happens, before the above described dangerous situation occurs, in addition to the command sent to the principal transmission, a corresponding command is sent to the range gearing for shifting into a neutral position and an engagement of the brake-clutch is delayed for a period, until it is properly confirmed that both the principle transmission and the range gearing are in the neutral position by signals from the appropriate sensors.

The invention claimed is:

1. A method preventing undesired rolling of a vehicle from a stationary position wherein the vehicle has a drive train comprising an automated clutch, an automated manual transmission, and a control device for controlling at least the automated clutch and the automated manual transmission and at least one transmission idling configuration along the drive train where a mechanical neutral configuration of the automated manual transmission is settable, the method comprising the steps of:

determining a basis for shifting the automated manual transmission to the neutral position;

establishing, via the control device during a gear shift of the automated manual transmission to the neutral position, at least two transmission idling configurations in the drive train, if the basis for shifting the automated manual transmission to the neutral position is not directly attributed to a driver request, and maintaining the automated clutch in a disengaged state for a sufficient amount of time, via the control device, when establishing the at least two transmission idling configurations of the automated manual transmission, in order for the control device to confirm that the at least two transmission idling configurations in the drive train have been established before the control device re-engages the clutch.

2. The method according to claim 1, further comprising the step of preventing engagement of the automated clutch until the control device receives information that at least one of the at least two transmission idling configurations in the drive train has been established.

3. The method according to claim 1, further comprising the step of preventing engagement of the automated clutch until the control device receives information that the two transmission idling configurations in the drive train has been established.

4. The method according to claim 1, further comprising the step of establishing the at least two transmission idling configurations in the drive train by controlling at least two of a main transmission, a splitter group, and a range-change group of the automated manual transmission and a switchable transfer case.

5. A control device for preventing undesired rolling of a vehicle from a stationary position the vehicle having a drive train comprising an automated clutch, an automated manual transmission, and a control device, which controls at least the automated clutch, the automated manual transmission and at least one transmission idling configuration along the drive train where a mechanical neutral position of the automated manual transmission can be set;

a decision-making unit for determining a basis for shifting the automated manual transmission to the mechanical neutral position;

wherein a sub-unit is installed within the control device and the sub-unit, during a gear shift of the automated manual transmission to the neutral position, sends a signal for selling the drive train into at least two transmission idling configurations for setting the neutral position, and the sub-unit, at the point in time when a gear of the automated manual transmission is shifted to the neutral position, maintains the clutch in a disengaged position for an amount of time that is sufficient for emission of a signal which includes information confirming the setting of at least one of the transmission idling configurations in the mechanical neutral position;

the sub-unit emits a clutch disengaging signal after at least two actuation signals, relating to setting of the at least two transmission idling configurations, are present; and the control device during the ear shift of at least the automated manual transmission to the neutral position, sets the two transmission idling configurations in the neutral position, if the decision-making unit can not directly trace the gear shift back to a drive request.

6. The control device according to claim 5, wherein the control device controls and regulates the drive train of a commercial vehicle in which the automated manual transmission comprises at least two of the automated manual transmission, a main transmission, a splitter group, a range-change group and a switchable transfer case.

* * * * *